United States Patent [19]

Violette

[11] Patent Number: 5,213,262
[45] Date of Patent: May 25, 1993

[54] IN-GROUND SPRINKLER HEAD GUARD

[76] Inventor: Joseph G. Violette, 1312 SE. 2nd Pl., Cape Coral, Fla. 33990

[21] Appl. No.: 877,715

[22] Filed: May 4, 1992

[51] Int. Cl.⁵ .............................................. B05B 15/06
[52] U.S. Cl. .................................... 239/203; 239/207; 239/288.5; 47/33
[58] Field of Search .................. 239/288, 288.3, 288.5, 239/200, 201, 203, 204, 205, 207; 52/169.7; 47/33

[56] References Cited

U.S. PATENT DOCUMENTS

| | | | |
|---|---|---|---|
| 517,085 | 3/1894 | Wheat. | |
| 1,105,993 | 8/1914 | Munson | 239/201 X |
| 1,717,709 | 6/1929 | Johnson | 239/288.5 |
| 2,080,341 | 5/1937 | Schumacher | 239/201 |
| 2,751,250 | 6/1956 | Block | 239/288.3 X |
| 3,015,448 | 1/1962 | Hurless | 239/288.5 X |
| 3,018,057 | 1/1962 | Anderson | 239/201 |
| 3,265,310 | 8/1966 | Cohen | 239/203 X |
| 3,662,956 | 5/1972 | Hedman | 239/288.5 X |
| 3,762,642 | 10/1973 | DiSanto | 239/288.5 X |
| 3,830,434 | 8/1974 | Green et al. | 239/201 X |
| 3,904,120 | 9/1975 | Sbicca | 239/288.5 X |
| 4,108,439 | 8/1978 | McGuire | 239/201 X |
| 4,146,181 | 3/1979 | Soos | 239/288.5 |
| 4,429,832 | 2/1984 | Sheets | 239/288.5 X |
| 4,582,256 | 4/1986 | Jaquez | 239/288.5 |
| 4,892,252 | 1/1990 | Bruninga | 239/228.5 X |
| 5,037,030 | 8/1991 | Apodaca | 239/288 |
| 5,102,048 | 4/1992 | Bohnhoff | 239/288.5 X |

Primary Examiner—Andres Kashnikow
Assistant Examiner—William Grant
Attorney, Agent, or Firm—William E. Noonan

[57] ABSTRACT

An in-ground sprinkler head guard is disclosed, which includes a canister embedded in the ground and having a central channel for receiving the sprinkler head. A chamber is disposed about the channel and includes spaced apart inner and outer walls, a closed bottom portion and an open top portion for selectively introducing a ballast material into the chamber. A lid is engaged with the canister and disposed proximate the surface of the ground to cover the top portion of the chamber. The lid has a central opening that is generally axially aligned with the sprinkler head and disposed generally above the sprinkler head, at least when the sprinkler head is inactive.

10 Claims, 3 Drawing Sheets

IN-GROUND SPRINKLER HEAD GUARD

FIELD OF THE INVENTION

This invention relates to a device for guarding in-ground sprinkler heads and, more particularly, to a guard that is especially suited for protecting pop-up rotary and spray type sprinkler heads.

BACKGROUND OF THE INVENTION

In-ground lawn sprinkling systems typically comprise a PVC conduit that is run beneath the ground. One or more sprinkler heads are connected to the conduit by suitable T-connectors such that the sprinkler heads are positioned at or proximate to the surface of the ground. Unfortunately, such positioning makes the sprinkler heads extremely susceptible to damage from lawn maintenance and landscaping equipment. For example, the head may be crushed by a tractor or struck by a lawn mower blade, particularly if the operator is inattentive or distracted. Repairing or replacing a broken or faulty sprinkler head or T-connector also presents a problem. Typically, the ground around the head must be dug up and then replaced. This can be messy and time consuming and often requires strenuous effort. Digging around the in-ground sprinkler is a particular problem during the winter months in cold weather climates where the ground is often frozen.

To protect in-ground sprinkler heads from equipment damage, a number of cylindrical or donut-shaped protectors have been developed. However, these products do not provide totally satisfactory results. Conventional donut-shaped protectors tend to be relatively easily dislodged from the ground, particularly when engaged by heavy lawn maintenance machinery. Moreover, such protectors still leave the top of the sprinkler head exposed and susceptible to damage. Additionally, installing and removing these guards is quite inconvenient. The ground must be dug around the sprinkler head and the protector installed so that it is virtually flush with the surface of the ground. Excavating and replacing such protectors involves still further time and labor.

SUMMARY OF INVENTION

It is therefore an object of this invention to provide a guard that effectively protects in-ground sprinkler heads against damage from landscaping and lawn maintenance equipment.

It is a further object of this invention to provide an in-ground sprinkler head guard that is easy to install and convenient to remove and replace when access to the sprinkler head or underground T-connector is required.

It is a further object of this invention to provide an in-ground sprinkler head guard that may be adjusted in weight and density for particular applications.

It is a further object of this invention to provide an in-ground sprinkler head guard that provides improved clearance and protection for the top of the sprinkler head.

It is a further object of this invention to provide an in-ground sprinkler head guard that is particularly effective for use with pop-up rotary and spray type sprinklers.

This invention features an in-ground sprinkler head guard including a canister that is embedded in the ground and has a central channel for receiving the sprinkler head. A chamber disposed about the channel includes spaced apart inner and outer walls, a closed bottom portion and an open top portion for selectively introducing a ballast material into the chamber. A lid is engaged with the canister proximate the surface of the ground to cover the top portion of the chamber. The lid has a central opening that is generally axially aligned with the sprinkler head and disposed generally above the sprinkler head, at least when the sprinkler head is inactive and retracted.

In a preferred embodiment the chamber has a generally cylindrical shape. The outer wall of the canister may be tapered from the top portion to the bottom portion of the chamber. The central opening is preferably large enough to permit the sprinkler head to move upwardly and downwardly through the opening. The canister may include a lip formed on the outer peripheral surface thereof proximate an upper end of the canister for facilitating removal of the canister from the ground.

Means may be provided for selectively attaching the lid to the canister. Such means for selectively attaching may include a rib formed about at least one of a periphery of the lid and an inside peripheral surface of the canister and a groove formed about the other of a periphery of the lid and the inside peripheral surface of the canister for receiving the rib to attach the lid to the canister. At least one of the lid and the canister may include a relatively flexible material that is manipulated to selectively attach the lid to and detach the lid from the canister. The canister may include an expansion slot formed in an upper end of the canister and extending generally toward a bottom end thereof for permitting the upper end of the canister to be selectively expanded to attach the lid to and detach the lid from the canister. The canister may include a lip formed on the outer peripheral surface thereof proximate an upper end of the canister for facilitating removal of the canister from the ground.

DISCLOSURE OF PREFERRED EMBODIMENTS

Other objects, features and advantages will occur from the following description of preferred embodiments and the accompanying drawings, in which.

Figure 1:
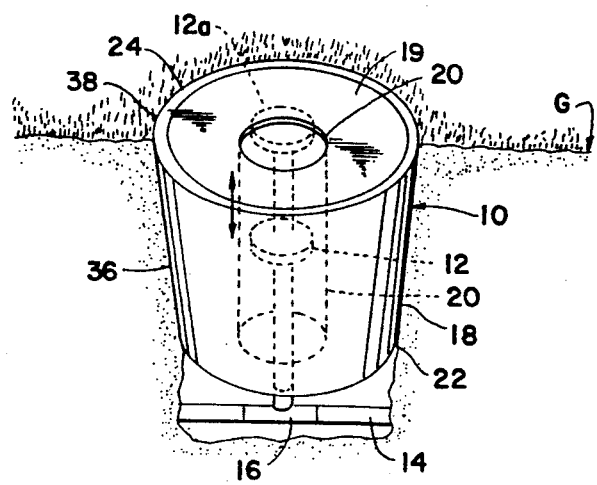
FIG. 1 is a perspective, partially cut away view of a preferred in-ground sprinkler head guard according to this invention.

A preferred guard for in-ground sprinkler heads, in accordance with this invention, includes a canister and a lid that is snap fit onto the canister. More particularly, the canister comprises a generally cylindrical member having an annular chamber and a central channel therethrough. In alternative embodiments various noncylindrical shapes may be employed. The bottom end of the chamber is closed and the upper end of the chamber is open. As a result, sand, cement, pebbles or other ballast material may be added to the chamber. The amount of ballast that is used is selected to adjust the strength, rigidity and weight of the canister.

A lid having a central opening is selectively engaged with the canister. Preferably, the lid is snap fit or otherwise attached to the top end of the canister such that it covers the upper end of the chamber. In this position the central opening of the lid communicates with the central channel of the canister.

The canister and the lid may be composed of various rugged materials. Preferably, a plastic such as PVC is utilized. Other preferred materials include Monsanto Triax (TM) and Plymouth Superflexon (TM). This material should be durable, yet lightweight. Preferably, it should also be flexible so that the lid can be snap fit or otherwise selectively engaged with the canister. To assist such engagement one or more expansion slots may be provided in the upper edge of the canister. Such slots allow the open upper end of the canister to expand so that the lid is securely received by the canister. The canister may be provided in various heights and widths. The components of the canister and lid may be formed in a number of ways such as by conventional molding techniques.

The guard is embedded in the ground such that it surrounds the in-ground sprinkler head. More particularly, the sprinkler head extends upwardly through the central channel in the canister. When the sprinkler head is inactive, the lid extends generally above the top of the sprinkler head and the central opening is generally axially aligned with the sprinkler head. Although the size of the opening is not a limitation of this invention, it is generally on the order of 1.25″ to 1.5″. More particularly, the central opening is large enough to permit a pop-up sprinkler to pass through the opening; however, it is small enough that tractor wheels and other landscaping equipment cannot pass through the opening and crush or otherwise damage the sprinkler head. Typically, a larger opening is provided for pop-up rotary sprinkler heads and a smaller central opening is utilized for pop-up sprayer variety heads. It is further preferred that the lid be approximately ⅜ thick, although this dimension may also be varied in accordance with this invention. The thickness and strength of the material used for the lid allows the lid to withstand the weight of tractors and other lawn maintenance equipment. As a result, such equipment can be driven over the guard without damaging the sprinkler head. It is important that the guard be embedded such that the lid and upper end of the guard are proximate to, and preferably slightly below the surface of the ground. As a result, lawn mower blades and trimmers can pass over the guard without striking and causing damage to it.

A further significant beneficial feature of this invention is that the guard is quite convenient to remove from and replace in the ground. To facilitate removal, a peripheral lip is provided about the upper end of the canister. Additionally, the canister is tapered slightly (e.g. 5°-10°) from top to bottom. Accordingly, the canister is removed by simply digging out slightly around the lip, grasping the lip and pulling the canister upwardly. The taper permits the canister to slide easily out of the ground. As a result, an opening that conforms to the size of the guard is formed about the sprinkler head. Time consuming and difficult digging is eliminated and ample room is provided about the sprinkler head to perform necessary replacement and/or repairs.

There is shown in FIG. 1 a sprinkler head guard 10 that is embedded in the ground G such that it surrounds and protects a pop-up variety in-ground sprinkler head 12 (shown in phantom). The sprinkler head is a conventional item that extends upwardly from and is connected to an underground sprinkler conduit 14. More particularly, the sprinkler head 12 is connected to conduit 14 by a conventional T-connector 16. When pop-up sprinkler head 12 is inactive it is positioned at or slightly below the upper surface of ground G. When the sprinkler is activated, head 12 pops upwardly to the position indicated by 12a. Subsequently, when the sprinkling system is deactivated, the head 12 retracts to its lower position.

One of the problems with sprinkler head 12, if left unprotected, is that lawn maintenance equipment is apt to crush or otherwise damage the head. Additionally, digging around the head to remove or replace it or to access T-connector 16 is very inconvenient. Guard 10 overcomes these above difficulties. It includes a generally cylindrical canister 18 and a generally circular lid 19 that is engaged with the upper end of canister 18 in a manner described more fully below. Guard 10 is installed at the same time that the sprinkler head 12 is installed in ground G. In particular, canister 18 includes a central channel 20 that receives sprinkler head 12. Accordingly, after the head is attached to T-connector 16, canister 18 is positioned about head 12 and lowered into the ground until the lower end 22 of the canister is positioned slightly above sprinkler conduit 14 and T-connector 16 and the upper end 24 of the canister is generally level with or slightly below the upper surface of ground G. The canister should have a height that generally corresponds to the depth of the T-connector and, therefore, various canister sizes may be available to accommodate differing sprinkler arrangements.

Figure 2:
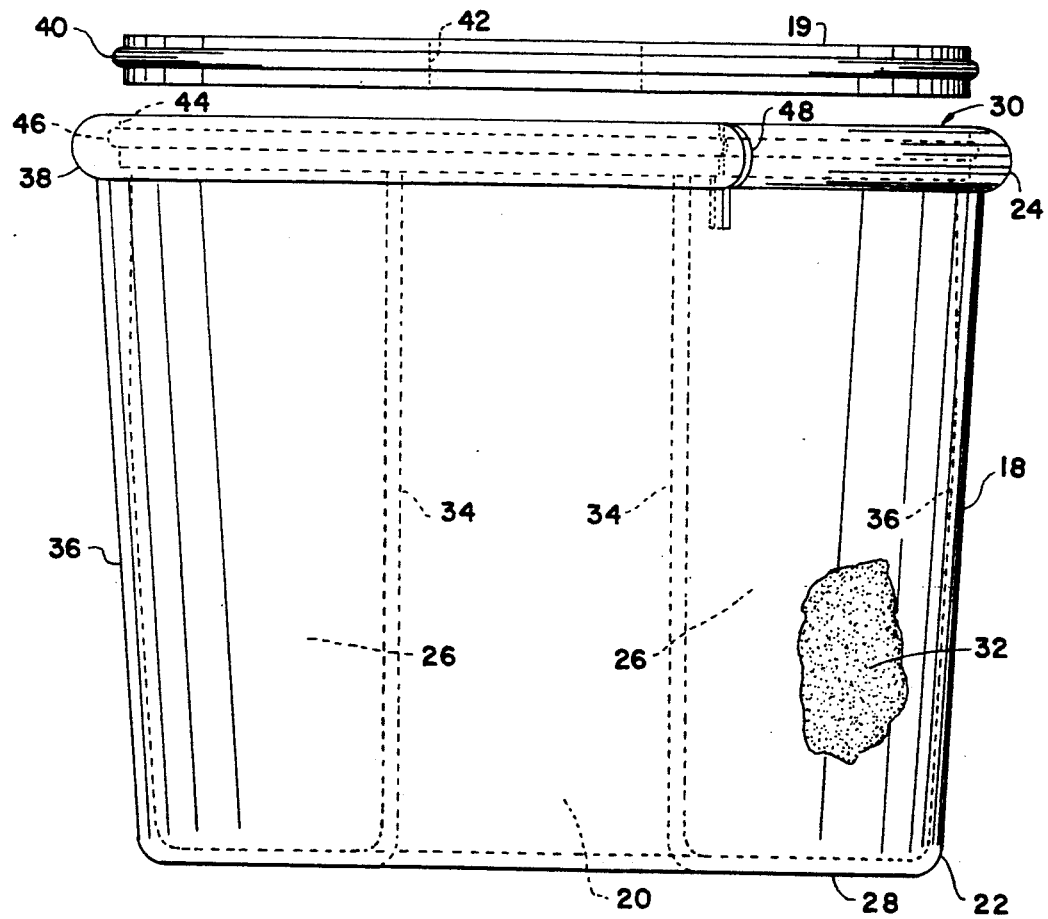
FIG. 2 is an exploded elevational view of the canister and lid that comprise the guard.

As shown in FIG. 2, canister 18 includes a generally annular chamber 26 that surrounds central channel 20. The bottom end 28 of chamber 26 is closed and when lid 19 is disengaged from canister 18, the upper end 30 of chamber 28 is open. As a result, ballast material such as sand 32 may be introduced into chamber 26. This provides added weight rigidity and strength to guard 10. Such ballast material is typically added to the chamber before lid 19 is engaged with canister 18 and the guard is introduced into the ground.

As best shown in FIG. 2, chamber 26 includes an inner wall 34 that defines the central channel 20 and an outer wall 36 that defines the periphery of canister 18. Outer wall 36 is tapered slightly from top end 24 to lower end 22. This taper, which is preferably 5°-10°, permits the canister and guard 10 to be removed readily from the ground when sprinkler repairs are required. Upper end 24 of canister 18 also includes a circumferential lip 38 that further facilitates such removal, in the manner described more fully below.

Figure 3:
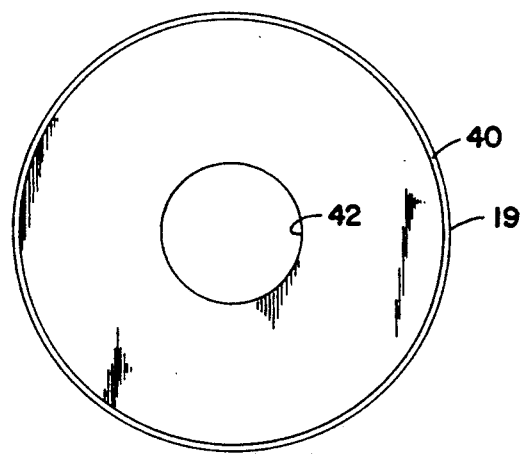
FIG. 3 is a plan view of the lid.

As best shown in FIG. 3, lid 19 is a generally planar element and has an annular shape. A circular rib 40, FIGS. 2 and 3, is formed integrally about the outer edge of lid 19. An opening 42 is formed centrally through the lid.

Figure 4:
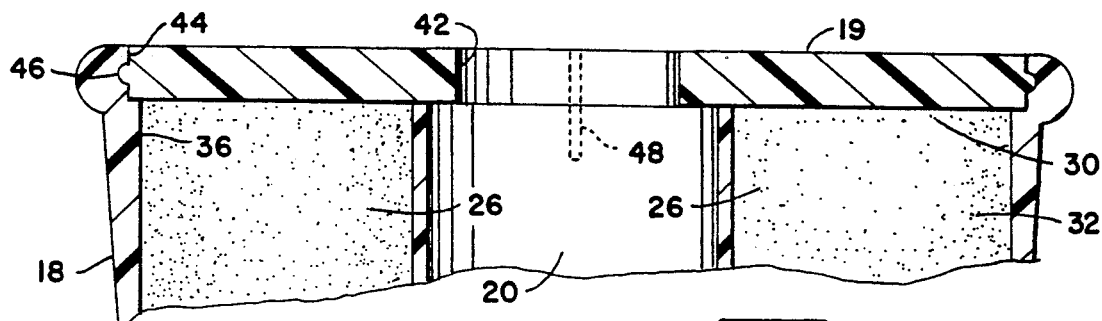
FIG. 4 is a partial cross sectional side view of the guard wherein the lid is engaged with the canister.

Means are provided for attachably engaging lid 19 to upper end 24 of canister 18. In particular, as best shown in FIG. 2, the upper end of the canister includes a mouth 44 having a diameter that is slightly larger than the diameter of lid 19, but slightly smaller than the diameter formed by integral rib 40 on lid 19. An annular groove 46 formed about mouth 44 has a size and diameter for accommodating rib 40. Canister 18 and lid 19 are composed of a suitable flexible plastic material and a plurality of expansion slots 48 (only one of which is shown in FIG. 2) are formed along the upper end 24 of canister 18 such that they extend downwardly toward lower end 22. The plastic material used for the canister and the expansion slot 48 permits mouth 44 of canister 18 to be expanded slightly such that it receives lid 19. More specifically, mouth 44 is expanded to permit rib 40 to be snap fit into groove 46. When the rib is received by the groove, the resilient plastic material of upper end 24 causes mouth 44 to close around lid 19 so that lid 19 is securely attached to canister 18 in the manner shown in FIG. 4. Because the diameter of mouth 44 is slightly larger than the inner diameter of outer wall 36 of chamber 26, the upper end 30 of chamber 26 is fully covered by lid 19 and ballast material 32 is held securely in the chamber. In this condition, central opening 42 of lid 19 communicates with central channel 20 of canister 18.

Figure 5:
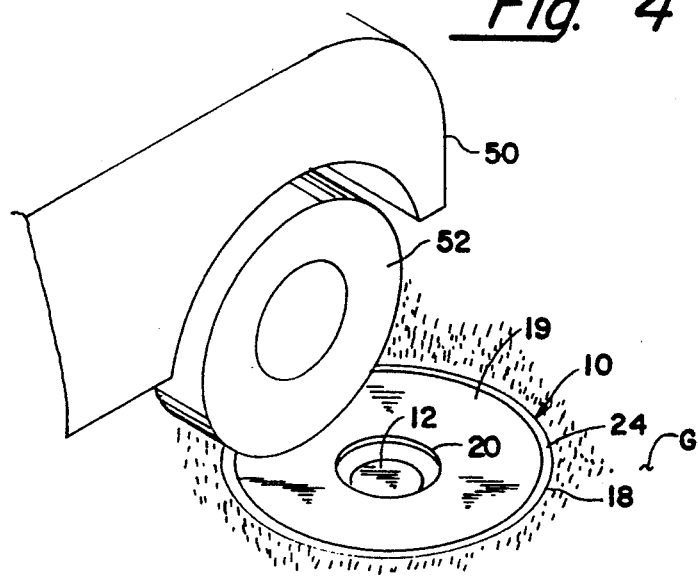
FIG. 5 is a perspective view illustrating the guard installed about an in-ground sprinkler and a piece of lawn maintenance equipment passing over the guard.

Guard 10 is assembled and installed in the following manner. Initially, a desired amount and type of ballast material is added to chamber 26. Next, lid 19 is attached to the canister 18 in the manner described above. After the sprinkler system is installed and before the ground is filled in around the sprinkler head, guard 10 is installed about sprinkler head 12 in the manner shown in FIG. 1. Ground G is then filled around outside wall 36 of guard 10 so that only the upper end 24 of canister 18 and the top surface of lid 19 are exposed, as shown in FIG. 5. When pop-up sprinkler head 12 is inactive, it is retracted below lid 19. As a result, when lawn maintenance equipment 50 is driven over guard 10, the lid 19 supports the equipment and protects head 12 from damage. Central opening 20 is small enough that wheel 52 of equipment 50 cannot pass through opening 20 and damage head 12. As stated above, it is also important that the upper portion 24 of the canister be positioned substantially at or even slightly below the upper surface of ground G so that the canister is not struck by equipment 50. Subsequently, the sprinkler head 12 may be operated without any interference from guard 10. In particular, head 12 is driven upwardly though opening 20 to the position designated by 12a, FIG. 1, so that it can spray the surrounding grass or plants in a conventional manner. Opening 20 is made large enough so that the sprinkler head being can move unhindered up and down therethrough.

Figure 6:
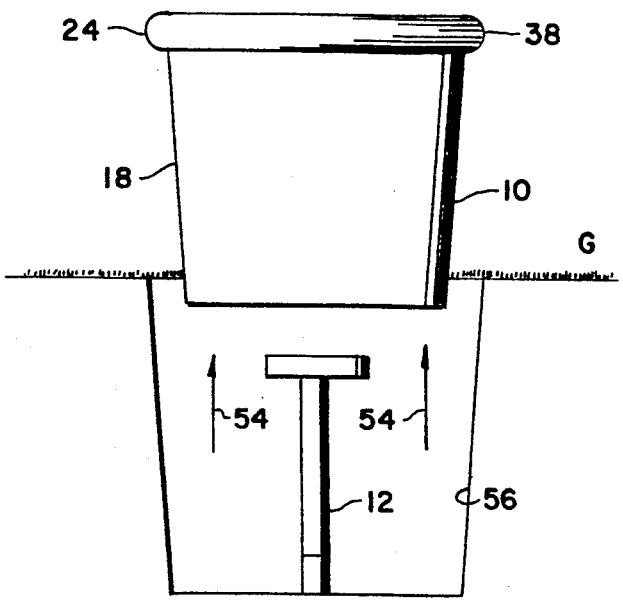
FIG. 6 is an elevational, cut away view of the guard being removed from about an in-ground sprinkler head.

If access is required to the sprinkler head or T-connector, or if the guard itself requires repair or replacement, the guard may be removed in the manner shown in FIG. 6. The homeowner, groundskeeper or lawn maintenance person making the repairs digs out slightly around the upper end 24 of canister 18 and grasps lip 38. The entire guard 10 is then pulled upwardly in the direction of arrows 54 so that the sprinkler head 12 is exposed. Removal is facilitated considerably because of the downwardly tapered outer wall 35 or canister 18. Guard 10 leaves behind a relatively wide opening 56 in ground G that permits ready access to the sprinkler head. Time consuming, messy and strenuous digging is thereby eliminated. This benefit is particularly advantageous during winter months in cold weather climates. In such locations it is often desireable to cap sprinklers, such as those located on golf courses, so that the sprinkler heads do not freeze. Guard 10 allows such sprinkler heads to be accessed relatively easily, even if the ground G is frozen because very little digging of the ground is required. And because digging is eliminated, there is less danger of damage being caused to the sprinkler head from digging tools. After the necessary maintenance is completed, guard 10 is replaced by simply lowering it into opening 56 such that it is disposed again about the sprinkler head.

Figure 7:
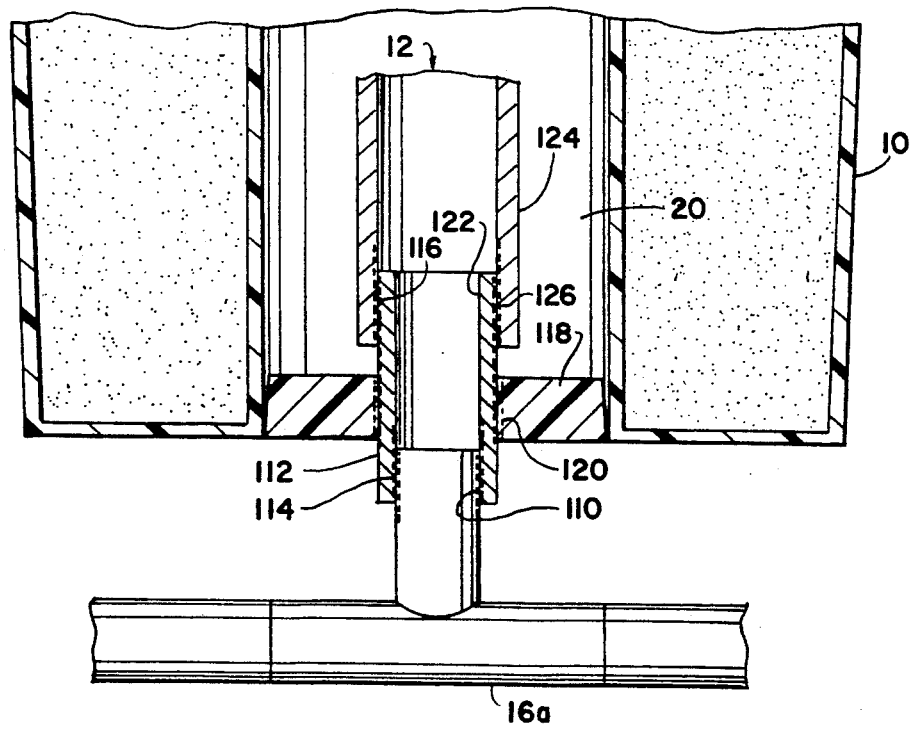
FIG. 7 is an elevational view of the underground guard with a plug and adapter for connecting the guard to the sprinkler system.

There is shown in FIG. 7 a means for securing guard 10 to the sprinkler system. In particular, T-connector 16a includes a threaded outer circumferential portion 110. An adapter 112 comprising a tubular element communicates with the T-connector 16a. In particular, the adapter includes an interiorly threaded lower portion 114 that engages the exteriorly threaded portion 110 of T-connector 16a. A plug 118 is inserted into the lower end of channel 20 such that it is held frictionally therein. Plug 18 includes a central threaded opening 120, which engages the threaded outer circumferential region 116 of adapter 112. As a result, guard 10, which carries plug 120, may be attached to adapter 112 simply by screwing the guard onto the adapter.

After guard 10 is fully tightened into position and into secure engagement with adapter 112, a segment 122 of the adapter extends above the plug 18 and into the channel 20 of guard 10. The lower end 124 of sprinkler head 12 includes a threaded inner circumference 126 that engages the threaded outer circumferential region 116 of adapter 112. As a result, sprinkler head 12 may be threadably secured to the upper segment 122 of adapter 112.

When the guard 10 and the sprinkler head 12 are attached to the adapter 112 in the above manner, a number of benefits are provided. Of particular importance is the fact that the guard and sprinkler head are securely maintained in an aligned condition. The guard is prevented from tipping and interfering with the sprinkler head. As a result, the sprinkler head extends cleanly through channel 20 and the upper end of the guard, not shown. Subsequently, the sprinkler head 12 and/or guard 10 may be removed and replaced from the T-connector by simply unscrewing the respective elements from the adapter 112.

In alternative embodiments, a number of variations may be made to the structure depicted in FIG. 7. For example, the adapter may be secured to an inside diameter of the T-connector or to an outside diameter of the sprinkler head. Such changes are made simply by forming threads on the inside or outside diameter of the adapter, as required. Additionally, plug 18 may be formed integrally with guard 10. Not only does this adapter arrangement hold the guard and sprinkler head securely in place and in alignment, it also permits the sprinkler head and guard to be quickly and conveniently changed and replaced with different sized elements.

Although specific features of the invention are shown in some drawings and not others, this is for convenience only, as each feature may be combined with any or all of the other features in accordance with the invention. Other embodiments will occur to those skilled in the art and are within the following claims.

What is claimed is:

1. An in-ground pop-up sprinkler head guard comprising:
   a canister embedded in the ground and having a central channel for receiving a sprinkler head and a chamber disposed about said channel, said chamber including spaced apart inner and outer walls, a closed bottom portion and an open top portion, said open top portion providing means for selectively introducing a ballast material into said chamber; and a lid that is engaged with said canister and disposed proximate the surface of the ground to cover said top portion of said chamber, said lid having a central opening that is generally axially aligned with said sprinkler head and being disposed generally above said, sprinkler head, at least when said sprinkler head is retracted.

2. The guard of claim 1 in which said outer wall is tapered from said top portion to said bottom portion of said chamber.

3. The guard of claim 1 in which said chamber has a generally cylindrical shape.

4. The guard of claim 1 further including means for selectively attaching said lid to said canister.

5. The guard of claim 4 in which said means for selectively attaching includes a rib formed about at least one of a periphery of said lid and an inside peripheral surface of said canister and a groove formed about the other of said periphery of said lid and said inside peripheral surface of said canister for receiving said rib to attach said lid to said canister.

6. The guard of claim 5 in which at least one of said lid and said canister includes a relatively flexible material that is manipulated to selectively attach said lid to and detach said lid from said canister.

7. The guard of claim 6 in which said canister is composed of a flexible material and includes an expansion slot formed in an upper end of said canister and extending generally toward an opposite bottom end thereof for permitting said upper end of said canister to be selectively expanded to attach said lid to and detach said lid from said canister.

8. The guard of claim 1 in which said canister includes a lip formed on an outer peripheral surface thereof proximate an upper end of said canister for facilitating removal of said canister from the ground.

9. The guard of claim 1 in which said central opening is sufficiently large to permit said sprinkler head to move upwardly and downwardly through said opening.

10. The guard of claim 1 further including a conduit for delivering water to said sprinkler head and means for releasably attaching said canister to said conduit.

* * * * *